United States Patent
Johansson et al.

(10) Patent No.: US 9,509,805 B2
(45) Date of Patent: Nov. 29, 2016

(54) REDUCTION OF PACKET HEADER COMPRESSION OVERHEAD DUE TO HIGH ECN RATE

(75) Inventors: Ingemar Johansson, Luleå (SE); Tomas Frankkila, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 44 days.

(21) Appl. No.: 14/361,797

(22) PCT Filed: Dec. 1, 2011

(86) PCT No.: PCT/SE2011/051466
§ 371 (c)(1),
(2), (4) Date: May 30, 2014

(87) PCT Pub. No.: WO2013/081518
PCT Pub. Date: Jun. 6, 2013

(65) Prior Publication Data
US 2014/0341015 A1    Nov. 20, 2014

(51) Int. Cl.
| H04L 12/28 | (2006.01) |
| G01R 31/08 | (2006.01) |
| H04L 29/06 | (2006.01) |
| H04L 12/811 | (2013.01) |
| H04L 12/801 | (2013.01) |

(52) U.S. Cl.
CPC .............. *H04L 69/04* (2013.01); *H04L 47/38* (2013.01); *H04L 69/22* (2013.01); *H04L 69/24* (2013.01); *H04L 47/33* (2013.01)

(58) Field of Classification Search
CPC ..... H04L 29/06; H04L 12/811; H04L 69/04; H04L 69/22; H04L 47/38; H04L 47/26; H04L 47/12; H04L 47/14; H04L 1/00; H04W 28/12; H04W 24/02

USPC ................ 370/230–235, 400, 389, 392, 401, 370/395.21, 394, 352–356
See application file for complete search history.

(56) References Cited

U.S. PATENT DOCUMENTS

| 7,859,996 | B2 * | 12/2010 | Kwan ..................... H04L 47/10 370/229 |
| 8,036,120 | B2 * | 10/2011 | Babiarz .................. H04L 12/66 370/232 |
| 8,804,765 | B2 * | 8/2014 | Pelletier ................ H04W 28/06 370/202 |
| 8,982,694 | B2 * | 3/2015 | Zhang .................... H04L 47/12 370/229 |
| 2004/0071096 | A1 | 4/2004 | Na et al. |
| 2010/0188977 | A1 | 7/2010 | Rochon et al. |
| 2011/0158096 | A1 | 6/2011 | Leung et al. |
| 2011/0170408 | A1 | 7/2011 | Furbeck et al. |

FOREIGN PATENT DOCUMENTS

JP    2005229378 A    8/2005

OTHER PUBLICATIONS

Extended European Search Report dated Jun. 22, 2015, issued in European Patent Application No. 11876636.9, 6 pages.

* cited by examiner

*Primary Examiner* — Hanh N Nguyen
(74) *Attorney, Agent, or Firm* — Rothwell, Figg, Ernst & Manbeck, P.C.

(57) ABSTRACT

An ECN flow controller (22) reduces packet header compression overhead due to high ECN rate. It includes an ECN filter (24) configured to redistribute, with at least approximately maintained ECN rate, ECN-CE marks among headers to reduce switching between ECN-CE marked and ECT marked headers.

14 Claims, 11 Drawing Sheets

REDUCTION OF PACKET HEADER COMPRESSION OVERHEAD DUE TO HIGH ECN RATE

CROSS REFERENCE TO RELATED APPLICATION(S)

This application is a 35 U.S.C. §371 National Phase Entry Application from PCT/SE2011/051466, filed Dec. 1, 2011, designating the United States, the disclosure of which is incorporated herein in its entirety by reference.

TECHNICAL FIELD

The present technology relates to reduction of reduction of packet header compression overhead due to high ECN (Explicit Congestion Notification) rate.

BACKGROUND

Header Compression

Header compression is a method used to compress IP (Internet Protocol) headers, and optionally also TCP (Transmission Control Protocol), UDP (User Datagram Protocol) and RTP (Real-time Transport Protocol) headers, for transmission over e.g. wireless links.

The compression efficiency when using header compression is based on the assumption that many fields in, e.g. the IP headers, contain information that is: static during the whole session; change rarely; or that the changes are predictable. For header fields that do not change, or are changed rarely during a session, it is common to first transmit the information and then uses states to store this information in the transmitter and in the receiver, respectively. Thereby, the static or rarely changing information can be recreated at the receiver, which makes it unnecessary to send this information in every packet. For header fields that change predictably, e.g. if the value is incremented with a fixed amount for each packet, it is common to detect the increment, send the initial value and possibly also the increment in the first packet. The receiver then calculates the value in the field, using the initial value and the increment.

Header Compression Using ROHC

ROHC [1a] provides considerable compression efficiency compared to no compression and many other header compression schemes. A packet containing an RTP/UDP/IPv4 (IP version 4) header (40 octets or bytes) can often be compressed to as little as 2-3 octets, or even 1 octet in some cases.

With ROHC, one typically gets the following overhead for the transmitted packets:

- The first packet requires full headers, i.e. the overhead is larger than for uncompressed headers. The full headers may be repeated for a few packets for robustness to packet losses.
- For the next few packets it is possible to use reduced headers, since ROHC is able to compress all static information. It may however still take some packets before the increment for the non-static fields has been predicted and before the overhead can be reduced to its minimum.
- After a few more packets, when ROHC has been able to estimate the increment to be used for the non-static fields, then the overhead can be reduced to the minimum, usually as little as 1-3 octets.

The sender can update all fields of the headers at any point in time, even those fields that were assumed to be static. This, however, requires increasing the overhead while the new static information is transmitted. The over-head needed to update static or semi-static information depends on the field which to be updated.

Explicit Congestion Notification (ECN)

ECN is described in [2] and is a method with which routers can inform the receiver that congestion has been detected in a router in the path. For example, for an IP header, two bits are reserved for this purpose. These two bits are used in the following way:

TABLE 1

Encoding of ECN bits

| ECN bits | Abbreviation | Usage |
| --- | --- | --- |
| '00' | Not-ECT | Set by sender if it is not ECN capable |
| '10' | ECT(0) | May be set by sender if it is ECN capable |
| '01' | ECT(1) | May be set by sender if it is ECN capable |
| '11' | ECN-CE | Set by congested router if incoming packet had either ECT(0) or ECT(1) |

Senders that are not ECN capable declare this by setting the ECN bits to non-ECT. If an ECN capable router detects not-ECT it is not allowed to mark the packet with ECN-CE. If congestion occurs in the router then it may drop some or many packets.

An ECN capable sender declares that it has "ECN Capable Transport" (ECT) by setting the ECN bits to either ECT(0) or ECT(1). A congested ECN capable router can then indicate congestion by marking the ECN bits with ECN Congestion Experienced (ECN-CE) and then forwarding the packet instead of dropping it.

An ECN capable receiver that detects an ECN-CE marked packet either informs the sender about the detected congestion or initiates methods to reduce the congestion, typically by requesting a reduced bitrate.

The ECN bits are typically part of another field, such as the ToS (Type of Service) octet in IPv4. In IPv6 the ECN bits are part of the Traffic Class field. Today the ToS field constitutes 6 bits for the DiffServ codepoint and 2 bits for ECN.

Relationship between ECN and ROHC

When ROHC was initially designed, the field in which the ECN bits are embedded, for example the ToS octet, was considered to be rarely changing. This means that whenever this octet changes some extra information must be transmitted. This extra information constitutes 5 extra octets of ROHC overhead in addition to the normal overhead of 1-3 octets (in total 6-8 octets of ROHC overhead).

The following ROHC overhead will be used when the ToS field is constant and when it is changing [1b], respectively:

ToS octet constant
  1. UO-0 baseheader (1 octet) [1c]
  2. UDP checksum (2 octets), copied from the UDP header ToS octet changing
  1. UOR-2 baseheader (3 octets) [1d], the X bit is set to '1' to indicate that the extension is included.
  2. Extension [1e], including:
     a) FLAGS octet (1 octet), showing that the included extension uses the Extension 3 format. The ip bit in the FLAGS octet is set to '1' to indicate that the "Inner IP header flags" octet is included.
     b) Inner IP header flags (1 octet), with the TOS bit set to '1' indicating that the TOS/TC field is included.
     c) TOS/TC field (1 octet), copied from the IP header 3. UDP checksum (2 octets), copied from the UDP header As the transmission channel is unreliable, it is common to repeat the extra overhead up to three times for every change. This means that the extra over-head is 5 bytes for three consecutive packets.

It has been studied how much impact the ECN rate (=proportion of ECN-CE marked packets) have on the ROHC overhead. The results are included in Table 2 below. The ECN rate needs to be measured over a number of packets, for example by using a sliding window over the last 100 packets.

TABLE 2

Additional ROHC compression overhead as a function of ECN rate.

| ECN rate [%] | Average extra overhead [octets/packet] | Average extra bitrate (assuming 50 packets/second) [bps] |
| --- | --- | --- |
| 1 | 0.23 | 92 |
| 2 | 0.41 | 163 |
| 5 | 0.92 | 369 |
| 10 | 1.75 | 700 |
| 20 | 2.88 | 1153 |
| 50 | 4.34 | 1734 |

From Table 2 it is clear that the extra overhead can potentially use a lot of resources, especially when the bitrate is low and the packet rate is high, and therefore potentially defeats the purpose of ECN.

An existing approach to handle this situation is to disregard the extra over-head due to the ECN rate. The Radio Access Networks (RAN) will assign a radio bearer with a certain maximum bit rate based on an estimation of the ROHC compression efficiency. If the RAN does not allocate any margin for the extra ROHC overhead, then it is likely that a UE (User Equipment) in the uplink or an eNodeB in the downlink will exceed the allocated maximum bitrate. A policing function may monitor the utilized bitrate and may perform rate shaping, e.g. by dropping or delaying packets, if the maximum bit rate is exceeded. This introduces packet losses and/or delay jitter that will impact the service quality. If, on the other hand, the RAN does allocate some extra margin for the extra ROHC overhead, then this reduces the number of sessions that can be allowed in the cell, and thus reduces the capacity.

SUMMARY

An object of the present technology is reduction of packet header compression overhead due to high ECN rate.

This object is achieved in accordance with the attached claims.

A first aspect involves applying an ECN filter for redistributing, with at least approximately maintained ECN rate, ECN-CE marks among headers to reduce switching between ECN-CE marked and ECT marked headers.

A second aspect involves an ECN flow controller including an ECN filter configured to redistribute, with at least approximately maintained ECN rate, ECN-CE marks among headers to reduce switching between ECN-CE marked and ECT marked headers.

A third aspect involves a network node including an ECN flow controller in accordance with the second aspect.

The present technology provides the ability to maintain a correct representation of ECN rate at the same time as it reduces the extra ROHC overhead that a changing field, such as a ToS field (ECN bits), cause.

The present technology does not require any changes to the PDCP (Packet Data Convergence Protocol) or RLC (Radio Link Control) layer. The solution therefore does not require any standardization and can be implemented as a proprietary enhancement. This also means reduced implementation effort and that the solution can be introduced without modifying the UEs.

BRIEF DESCRIPTION OF THE DRAWINGS

The technology, together with further objects and advantages thereof, may best be understood by making reference to the following description taken together with the accompanying drawings, in which.

DETAILED DESCRIPTION

The following description will focus on ROHC of IP headers. However, the same principles may be used in other compression schemes where switching between notifications indication "congestion" and "no congestion" leads to a larger compression overhead. These principles can also be applied to other header types discussed above.

The present technology is useful for real-time media transport using IP/UDP/RTP. The technology is, however, useful also for other services like streaming and for other transport protocols such as TCP.

Figure 1:
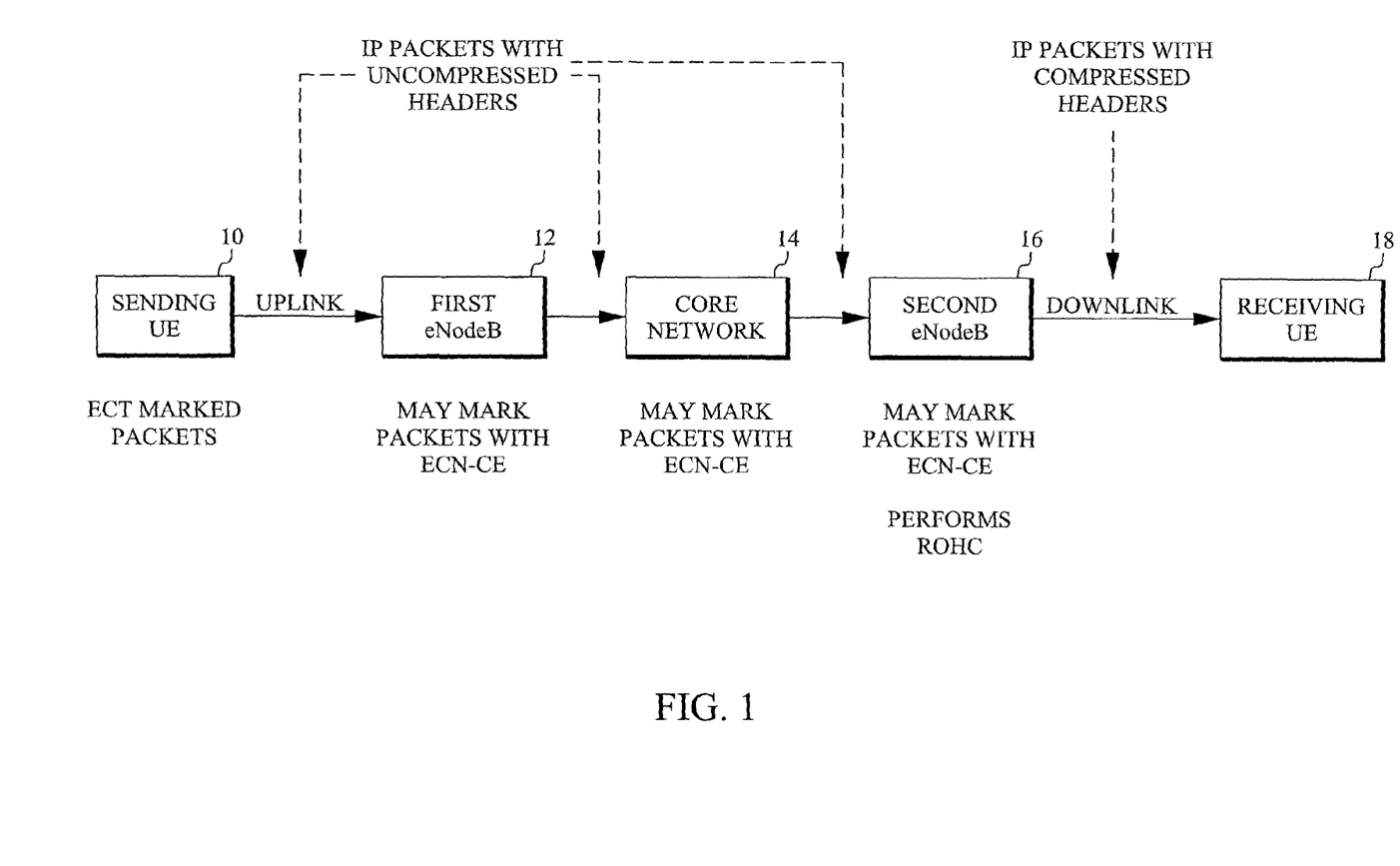
FIG. 1 is an overview of an example of an LTE (Long Term Evolution) system performing ROHC in the downlink.

FIG. 1 is an overview of an example of an LTE system performing ROHC in a downlink. In this example:

A sending UE 10 generates IP packets that are sent to a first eNodeB 12 over an uplink. The ECN bits in the IP packets are marked with ECT if it is ECN capable. If the UE 10 is not ECN capable or if ECN cannot be used in the session, then the UE 10 marks the packets with not-ECT.

The eNodeB 12 receives the IP packet from the UE 10. If the uplink is congested, and if the IP packet is marked with ECT, then the eNodeB 12 may overwrite the ECN bits with ECN-CE. If the uplink is not congested then the eNodeB 12 leaves the ECN bits unchanged.

The IP packet is then forwarded towards the receiver and passes through a core network 14, and possibly also through one or several backbone networks (in which case there are also further core networks), which are not shown in the figure. The Core Network 14, or the backbone network, may include one or more routers, which may also be congested. Thus, the Core Network, or the backbone network, may also mark packets with ECN-CE. If no congestion occurs then the ECN bits are left unchanged.

An eNodeB 16 receives the IP packet and forwards it to a receiving UE 18 over a downlink.

The IP packets in the system illustrated in FIG. 1 have uncompressed headers between elements 10, 12, 14, 16 and compressed headers on the downlink between the second eNodeB 16 and the receiving UE 18. In the example packets may be ECN-CE marked by, for example, a router in the first eNodeB 12, the core network 14 or the second eNodeB 16. In fact the ECN-CE marking may even be performed by the first UE 10. In this example the ROHC is performed by the second eNodeB 16, but it may also be performed in any of the preceding elements 10, 12, 14.

Figure 2:
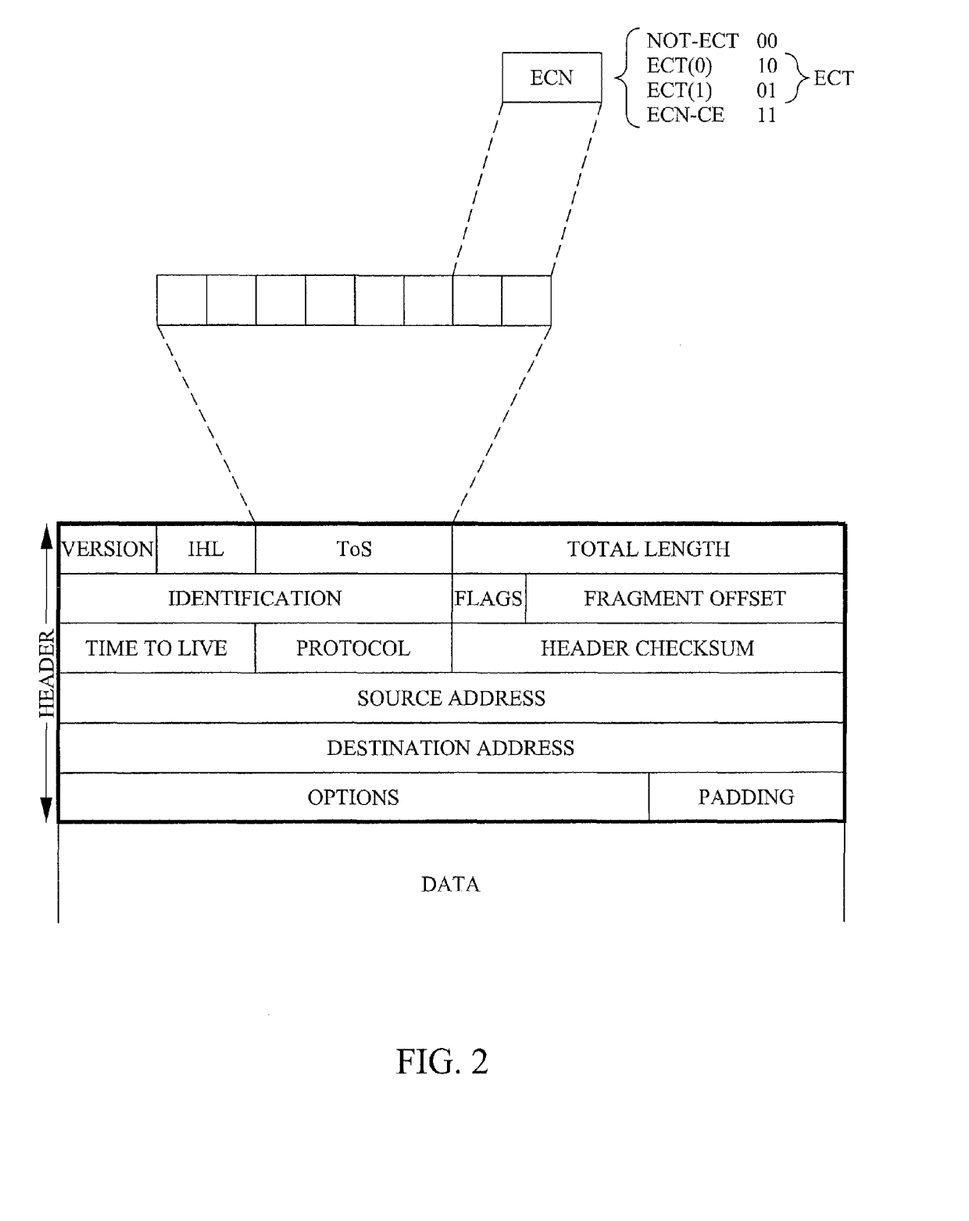
FIG. 2 illustrates the header structure of IPv4.

FIG. 2 illustrates the header structure of IPv4. Among other fields, this structure includes a ToS field having a length of 1 octet (or byte). Two of the bits of the ToS field are reserved for ECN. This admits 4 different codes. Of these codes the codes ECN(0), ECN(1) and ECN-CE are of special interest, For the purposes of the present technology the codes ECN(0) and ECN(1) are equivalent and are denoted ECT. Thus, the headers are considered to be either ECT marked or ECN-CE marked. When consecutive packets switch between these states, the ToS field changes, which implies that the header changes, which in turn forces a break up of the compression, as described above.

Figure 3:
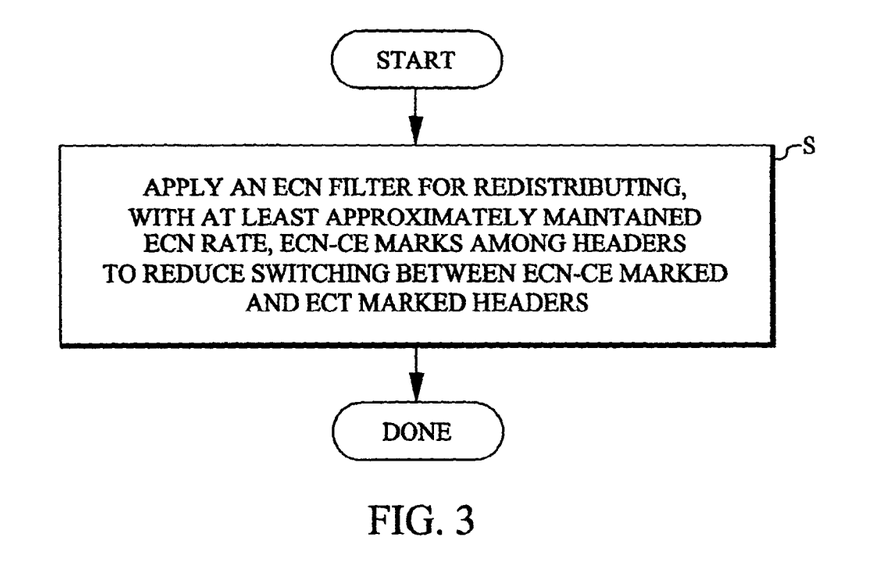
FIG. 3 is a flow chart illustrating the present technology.

The present technology relies on the observation that it is the change in the ToS octet that causes the extra overhead. The general solution is illustrated in FIG. 3, where step S applies an ECN filter for redistributing, with at least approximately maintained ECN rate, ECN-CE marks among headers to reduce switching between ECN-CE marked and ECT marked headers. This will reduce packet header compression overhead due to high ECN rates, while preserving the ECN rate. The ECN rate is typically proportional to the congestion level, and rate adaptation algorithms in the endpoints may rely on the ECN rate for rate adaptation. The ECN rate must therefore be preserved fairly well.

Figure 4:
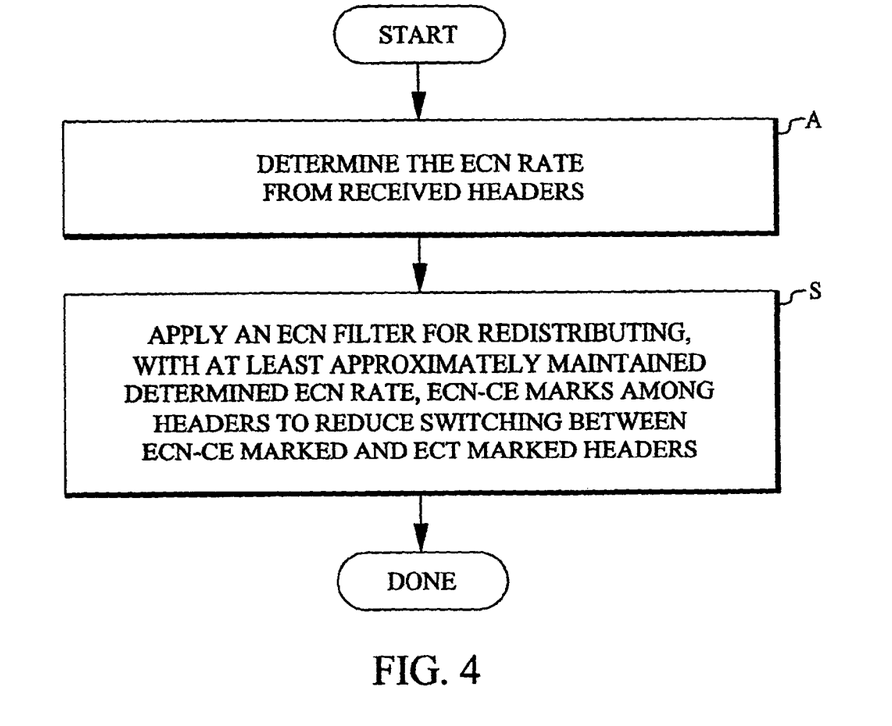
FIG. 4 is a flow chart illustrating an embodiment of the present technology.

FIG. 4 is a flow chart illustrating an embodiment of the present technology. In this embodiment step A determines the ECN rate from received headers, and step S applies an ECN filter for redistributing, with at least approximately maintained the determined ECN rate, ECN-CE marks among headers to reduce switching between ECN-CE marked and ECT marked headers.

Figure 5:
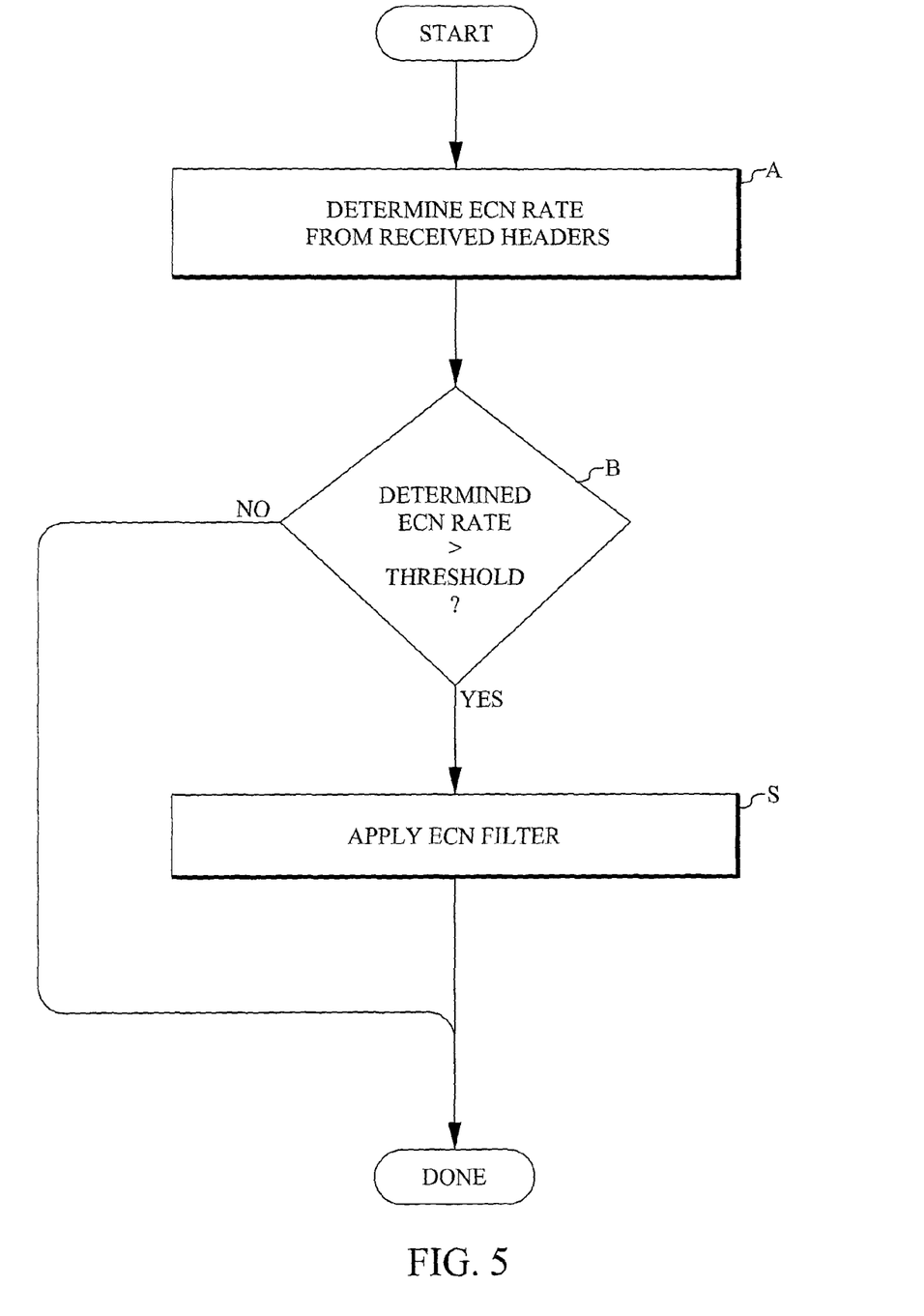
FIG. 5 is a flow chart illustrating an embodiment of the present technology.

FIG. 5 is a flow chart illustrating an embodiment of the present technology based on the embodiment of FIG. 4. Step A determines the ECN rate from received headers. Step B decides whether the determined ECN rate is greater than a threshold. If so, the ECN filter is applied in step S. Otherwise no action is taken. This embodiment has the advantage that for low ECN rates, occasional ECN-CE marks pass through without delay. Isolated ECN-CE marks may be indicative of future severe congestion and should therefore preferably be transported to the receiver without delay to enable a prompt response.

Figure 6:
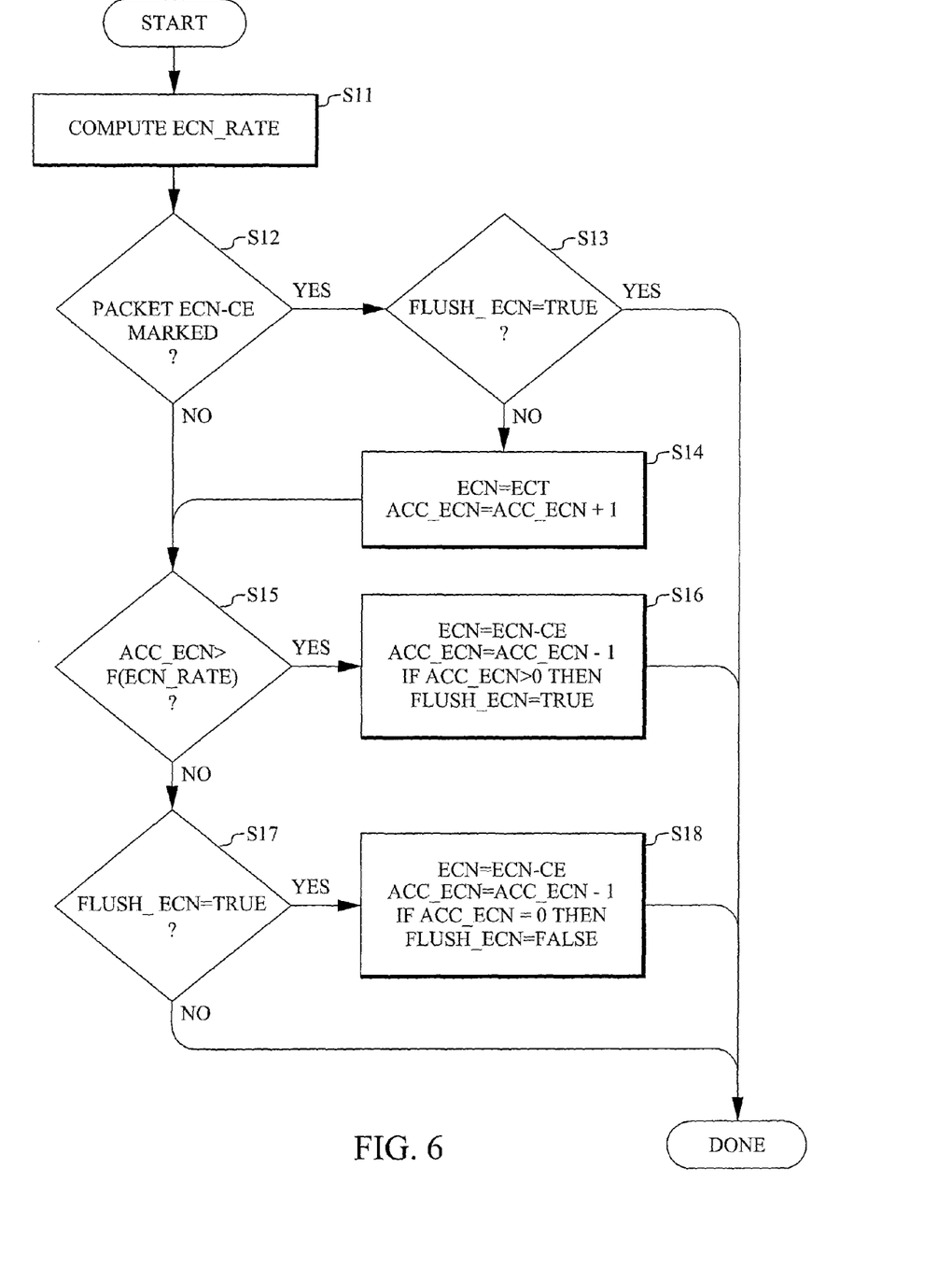
FIG. 6 is a flow chart illustrating an embodiment of the present technology.

FIG. 6 is a flow chart illustrating an embodiment of the present technology in more detail. The flow described in this chart is executed for each packet. The method uses 3 variables:

ECN_RATE Proportion of ECN-CE marked packets. This can be determined, for example, by a sliding window over the last 100 packets, as described with reference to Table 2 above.

ACC_ECN Number of accumulated ECN-CE marks. Initial value is zero.

FLUSH_ECN When "true", flushes all accumulated ECN-CE marks. Initial value is "false".

In this embodiment the variable ECN_RATE needs to be determined before the ECN filter is applied. This is because the ECN rate is used to determine a threshold within the ECN filter to switch the ECN filter on and off as follows:

As long as ACC_ECN is less than a function F(ECN_RATE), the ECN-CE marks are removed from the IP packets. The ECN filter increments the counter ACC_ECN for every removed ECN-CE mark. One can say that this "buffers up" the ECN-CE marks.

When ACC_ECN becomes larger than F(ECN_RATE), the ECN-CE marks are "flushed out" in the subsequent IP packets until ACC_ECN has been decremented to 0.

The function may, for example be chosen as:

$$F(\text{ECN\_RATE}) = \max(0, \min(10, 0.5*(100*\text{ECN\_RATE}-10))) \quad (1)$$

The first step S11 computes ECN_RATE. In this particular embodiment, with the given F(ECN_RATE) function, ECN-CE marks will pass through the filter (path S12, S13, S14, S15, S16) without delay as long as the measured ECN_RATE is below 10%. At higher ECN rates, ECN-CE marks will be grouped and sent in sequence which will ultimately mean that the change rate of the ToS byte decreases.

The core algorithm to group ECN-CE marks is: If the packet is ECN-CE marked (determined in step S12), the ECN-CE marking is removed by setting the ECN bits to ECT (step S14), unless FLUSH_ECN is "true" (tested in step S13). The counter ACC_ECN is used to count how many ECN-CE markings that have been removed, so that the same number of ECN-CE markings can be reinserted in later packets, thereby maintaining the ECN rate. The packet may later be ECN-CE marked if the logic decides that the ECN bits in this packet and possibly a number of subsequent packets should be set to ECN-CE. The function F(ECN_RATE) determines how many ECN-CE marked packets that are needed in order to set the ECN-CE for a number of consecutive packets. The function F(ECN_RATE) also determines (in step S15) if FLUSH_ECN is also to be set to "true" or "false". When FLUSH_ECN is set to "true", this will cause the ECN bits to be set to ECN-CE (in step S16) as long as the variable ACC_ECN is greater than zero. If ECN_RATE is low then the function F(ECN_RATE) will evaluate to zero, meaning that ECN-CE marked packets will pass unaffected by this function. If the incoming packets are not marked with ECN-CE (ECN bits show ECT) and if the ECN rate is low (including zero), then any buffered ECN-CE markings will be flushed out (FLUSH_ECN="true") until there are no more ECN-CE markings in the buffer (path S12, S15, S17, S18).

Figure 7A:
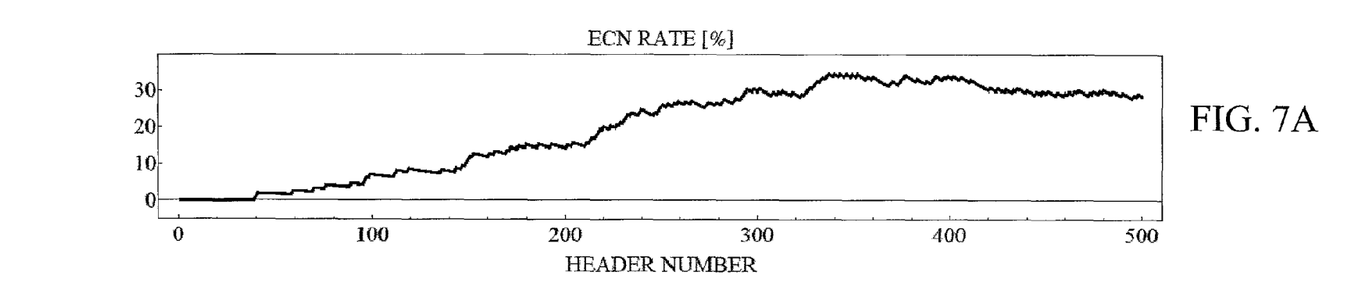
FIG. 7A-C are diagrams illustrating redistribution of ECN-CE marks in accordance with the embodiment of FIG. 6.
Figure 7B:
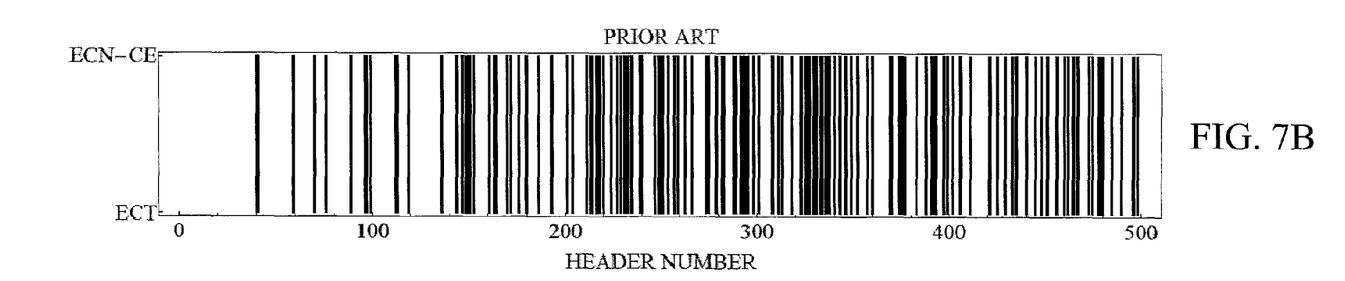
Figure 7C:
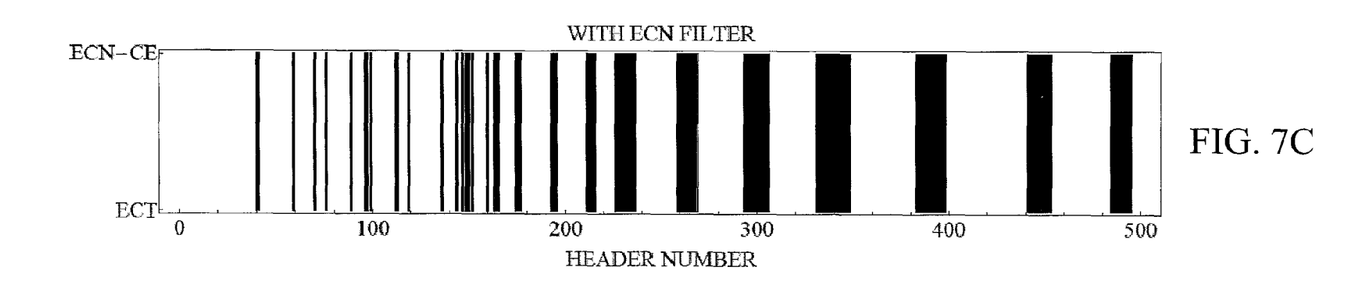

FIG. 7A-C are diagrams illustrating redistribution of ECN-CE marks in accordance with the embodiment of FIG.

6. FIG. 7A illustrates a variation of the ECN rate over a sequence of 500 headers. FIG. 7B illustrates the corresponding ECN sequence in accordance with the prior art. As can be seen from FIG. 7B this ECN sequence switches frequently between the ECT and ECN-CE states. FIG. 7C illustrates the result of applying the ECN filter described in FIG. 6 to the ECN sequence in FIG. 7B. It is noted that below an ECN rate threshold (10% in this example) the ECN-CE marks pass through the filter unaffected. For ECN rates above the threshold, the ECN-CE marks are collected into sequences, in which all packets are marked with ECN-CE. This also creates longer sequences where no packets are marked with ECN-CE. This reduces the switching between ECT-marked packets and ECN-CE marked packets.

Table 3 below shows that the extra ROHC overhead decreases considerably, compared to the results shown in Table 2.

TABLE 3

Additional ROHC compression overhead as a function of ECN rate with ECN filter embodiment of FIG. 6.

| ECN rate [%] | Average extra overhead [octets/packet] | Average extra bitrate (50 pkt/s) [bps] |
|---|---|---|
| 1 | 0.23 | 92 |
| 2 | 0.41 | 163 |
| 5 | 0.83 | 331 |
| 10 | 0.60 | 240 |
| 20 | 0.53 | 212 |
| 50 | 0.77 | 309 |

The example above used the specific threshold function in (1). A more general threshold function is:

$$F(ECN\_RATE)=\max(0, \min(WIDTH, 0.5*(100*ECN\_RATE-TH))) \quad (2)$$

Here WIDTH controls the width of ECN-CE marked sequences at high ECN rate and TH controls the threshold below which ECN-CE marks pass through unaffected.

A variation to the procedure above is to compute the ECN rate as before, but to use a set of thresholds to determine how the ECN bits should be marked depending on the ECN rate. A lower threshold is used to determine a level for the ECN rate (e.g. 10%) under which the ECT and the ECN-CE marks pass through untouched. Above this level the ECN marks are rearranged such that the ECN rate is approximately maintained but the ECN-CE marking is applied to consecutive packets. Example:
  ECN rate≤10%→ECT and ECN-CE marks are left untouched.
  10%<ECN rate≤20%→1 out of 10 packets are ECN-CE marked.
  20%<ECN rate≤30%→2 consecutive out of 10 packets are ECN-CE marked.
  30%<ECN rate≤40%→3 consecutive out of 10 packets are ECN-CE marked.
  Etc. . . .

The thresholds naturally do not have to be multiples of 10%. More generally M consecutive ECN-CE marked out of N packets will give a threshold M/N, where M and N are integers and M<N.

Figure 8:
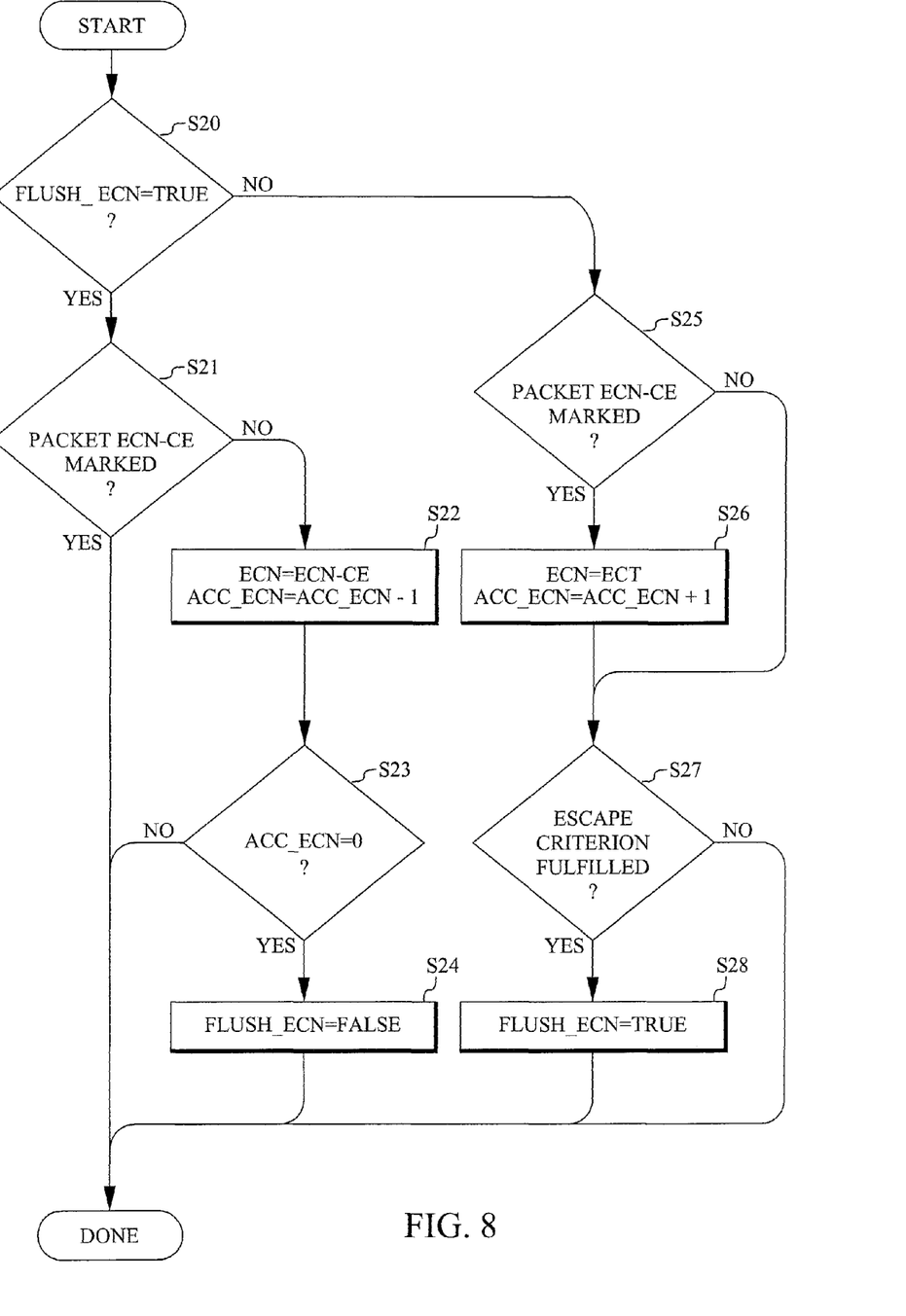
FIG. 8 is a flow chart illustrating an embodiment of the present technology.

An alternative method, an embodiment of which is illustrated in FIG. 8, is to use an ECN filter that uses an "escape criterion" instead of determining the ECN rate. This method works as follows:
  As long as the escape criterion is not fulfilled, the ECN filter "buffers up" the ECN-CE marks and resets the ECN bits in the IP packets to ECT (steps S25, S26, S27). The ACC_ECN counter is incremented for each IP packet where the ECN-CE mark was removed.
  When the escape criterion is fulfilled, the ECN filter "flushes" out the buffered ECN-CE marks in the subsequent packets (steps S28, S20, S21, S22; step 28 is executed only for the current packet, whereas steps S20, S21, S22 are executed for subsequent packets if they were not ECN-CE marked.). The ACC_ECN counter is decremented for each IP packet where the ECN-CE mark was re-inserted (step S22), which can only be done if the IP packet was not originally marked with ECN-CE (tested in step S21). The flushing is ended when ACC_ECN reaches zero (tested in step S23) and FLUSH_ECN is set to "false" (step S24).

What escape criterion to use depends on what objective one has with the ECN filter. Here are two examples:

EXAMPLE 1

If the objective is only to "group" ECN-CE marks, then the criterion could, for example, be to remove the ECN-CE marks and increment ACC_ECN until one has reached a certain threshold. This approach is simple, but results in that occasional ECN-CE marks are delayed, possibly quite a long time.

EXAMPLE 2

If the objective instead is to achieve "grouping" of the ECN-CE marks while still allowing single (occasional) ECN-CE marks to pass through, then the escape criterion needs to have two components, for example:
  1. One component that sets the escape criterion to "true" when enough ECN-CE marks have been buffered up, i.e. when ACC_ECN has reached a certain threshold.
  2. One component that sets the escape criterion to "true" if there are not enough ECN-CE marks in the incoming IP packets, for example:
    a. when only one of the last M (for example 10) packets were marked with ECN-CE; or
    b. when the portion of ECN-CE marked packets is too low, i.e. below a predetermined threshold, for example 10%.

With this escape criterion, single ECN-CE marks will be delayed in time but only for a short period, for example from packet N to N+10. However, if the packet rate is reasonably high, for example for speech that typically uses 50 packets/second, then this gives only a small delay which should have no or little impact on the overall performance.

Figure 9A:
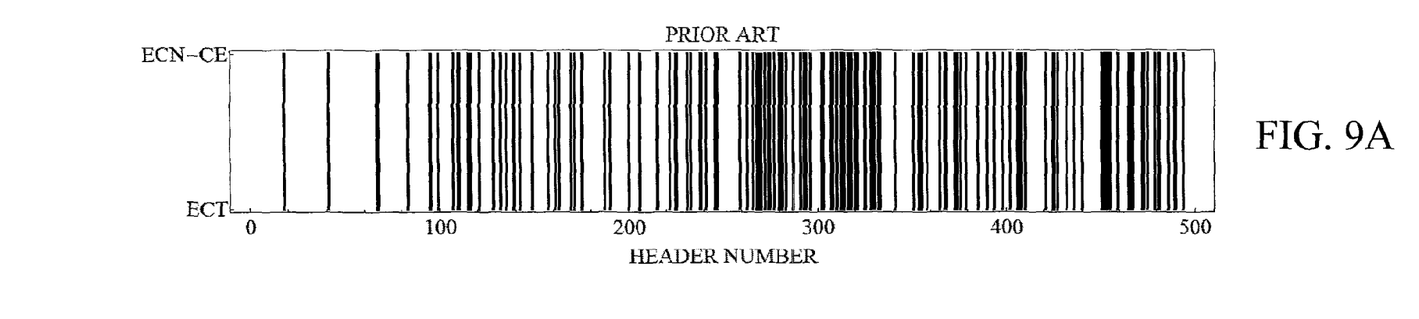
FIG. 9A-C are diagrams illustrating redistribution of ECN-CE marks in accordance with the embodiment of FIG. 8.
Figure 9B:
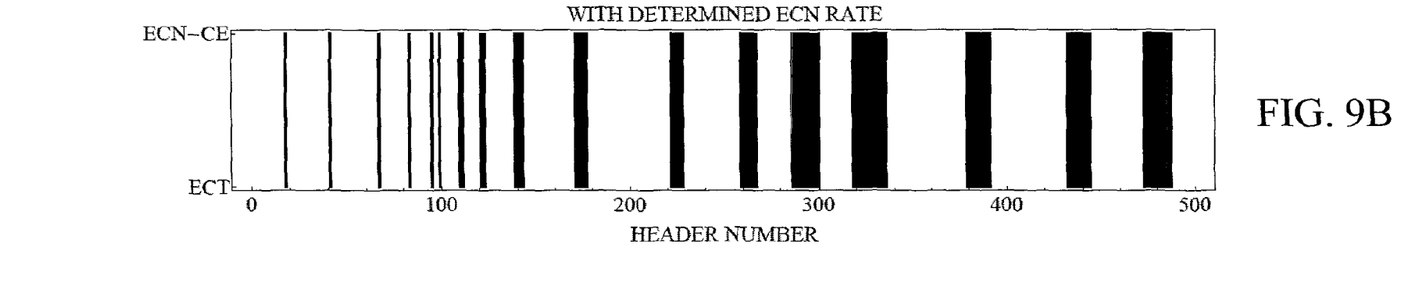
Figure 9C:
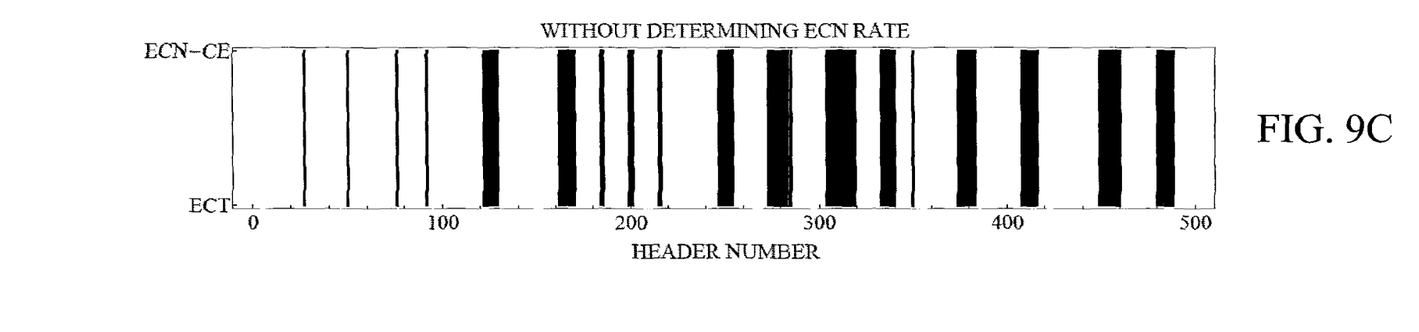

FIG. 9A-C are diagrams illustrating redistribution of ECN-CE marks in accordance with the embodiment of FIG. 8. FIG. 9A illustrates an ECN sequence in accordance with the prior art (this is similar, but not identical to the ECN sequence in FIG. 7B, since the two figures have been generated by different random number sequences). FIG. 9B illustrates the result of applying the ECN filter described in FIG. 6 to the ECN sequence in FIG. 9A. For comparison FIG. 9C illustrates the result of applying the ECN filter described in FIG. 8 to the ECN sequence in FIG. 9A, In FIG. 9C the escape criterion in Example 2 is used. It is noted that ECN-CE marked packet headers are slightly delayed at low ECN rates, and that there are occasional ECN-CE marks at high ECN rates in FIG. 9C.

The described methods typically generate sequences of consecutive packets with ECN-CE marked headers separated by sequences of consecutive packets with ECT marked headers. Furthermore, the number of consecutive packets with ECN-CE marked headers is typically increased as the ECN rate increases.

Figure 10:
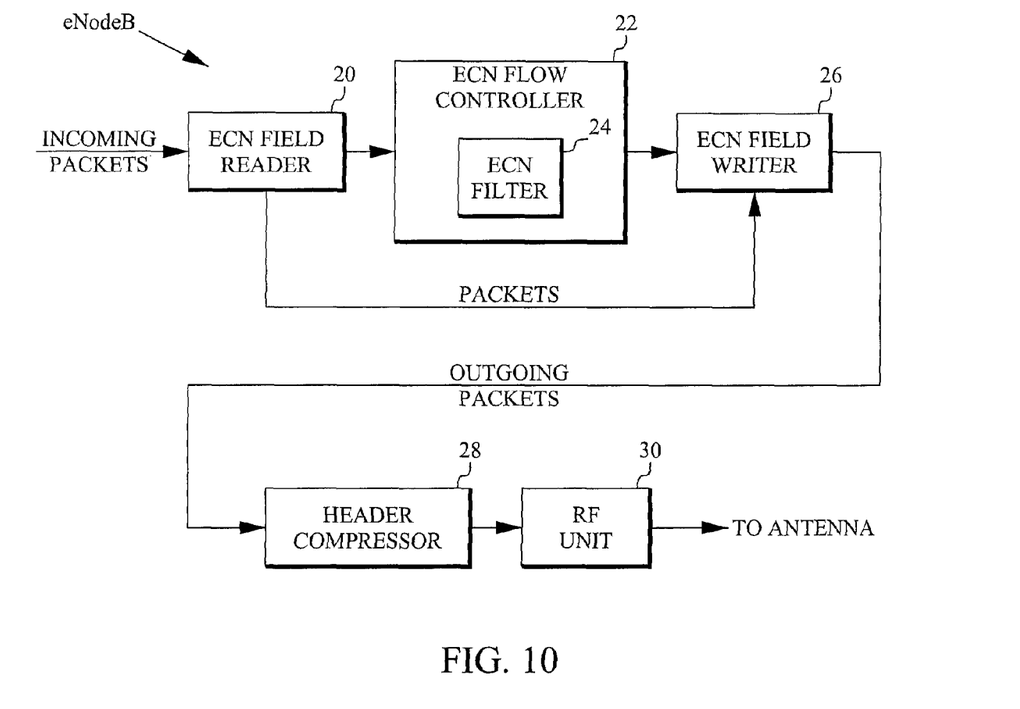
FIG. 10 is a block diagram illustrating an ECN flow controller in accordance with the present technology.

FIG. 10 is a block diagram illustrating an ECN flow controller 22 in accordance with the present technology installed in a network node, such as an eNodeB. Incoming packets are read by an ECN field reader 20, and the ECN bits are forwarded to the ECN flow controller 22, which includes an ECN filter 24 configured to redistribute, with at least approximately maintained ECN rate, ECN-CE marks among headers to reduce switching between ECN-CE marked and ECT marked headers, for example in accordance with one of the methods described above. The filtered ECN fields are forwarded to an ECN field writer 26, which writes the possibly changed field values into the headers of the corresponding outgoing packets. The outgoing packets are forwarded to a header compressor 28, and the packets with the compressed headers are forwarded to an RF unit 30 for transmission from an antenna.

Figure 11:
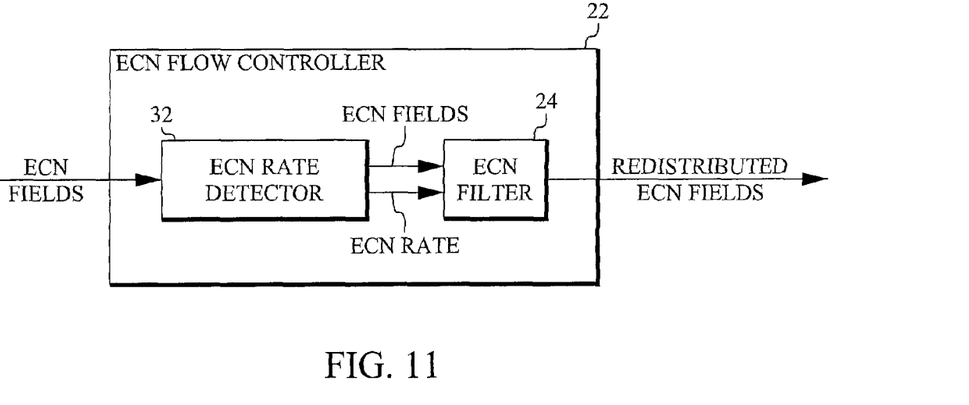
FIG. 11 is a block diagram of an embodiment of an ECN flow controller in accordance with the present technology.

FIG. 11 is a block diagram of an embodiment of an ECN flow controller 22 in accordance with the present technology. It receives ECN fields and includes an ECN rate detector 32 configured to determine the ECN rate from the received headers. The ECN rate detector 32 forwards the ECN fields and the determined ECN rate to the ECN filter 24, which outputs the redistributed ECN fields. This embodiment is suitable for performing ECN filtering based on tracking of the ECN rate of the incoming packets.

Figure 12:
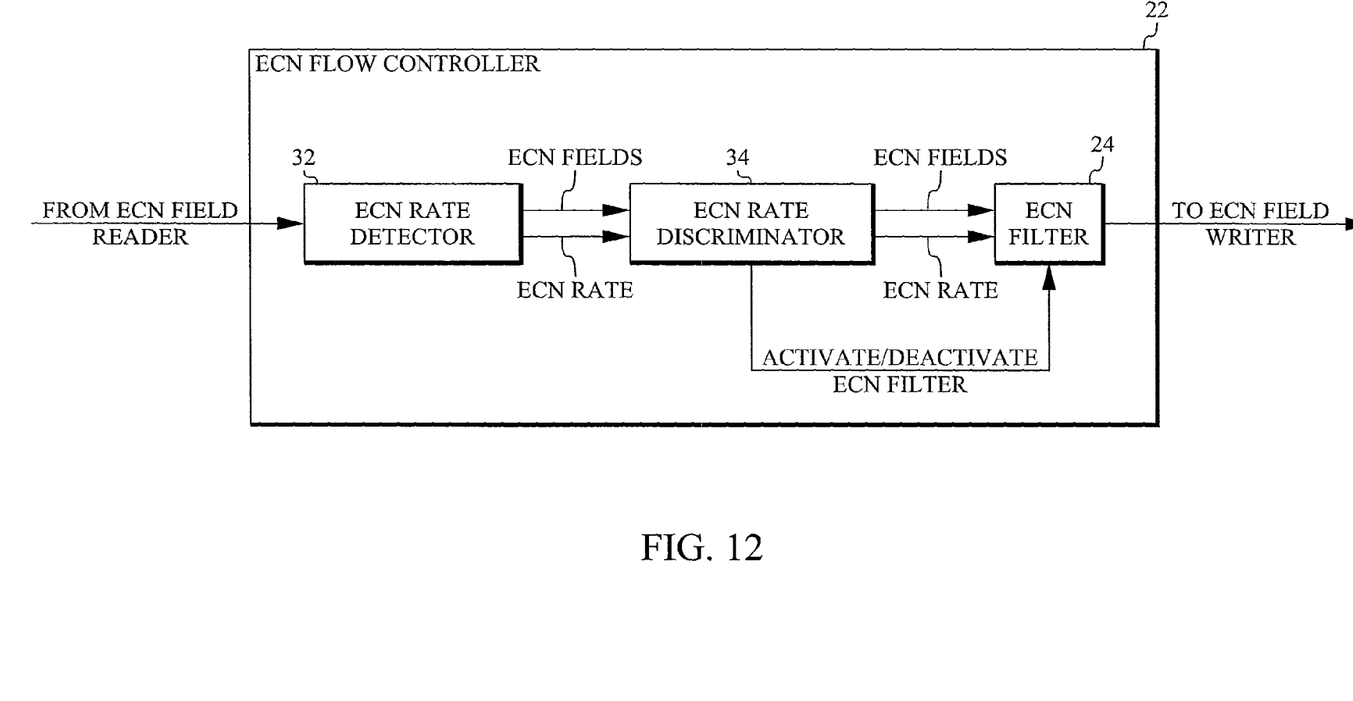
FIG. 12 is a block diagram of an embodiment of an ECN flow controller in accordance with the present technology.

FIG. 12 is a block diagram of an embodiment of an ECN flow controller 22 in accordance with the present technology. In addition to an ECN rate detector 32 it includes an ECN rate discriminator 34 configured to test whether the determined ECN rate exceeds a predetermined threshold, and to activate redistribution of ECN-CE marks by the ECN filter 24 when it exceeds the predetermined threshold. When the determined ECN rate does not exceed the predetermined threshold, redistribution of ECN-CE marks by the ECN filter 24 is deactivated. This embodiment is suitable for performing ECN filtering based on tracking of the ECN rate of the incoming packets and leaving ECN-CE marks unchanged at ECN rates below the threshold.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by a suitable processing device, such as a micro processor, Digital Signal Processor (DSP) and/or any suitable programmable logic device, such as a Field Programmable Gate Array (FPGA) device.

It should also be understood that it may be possible to reuse the general processing capabilities of, for example, a router. This may, for example, be done by reprogramming of the existing software or by adding new software components.

Figure 13:
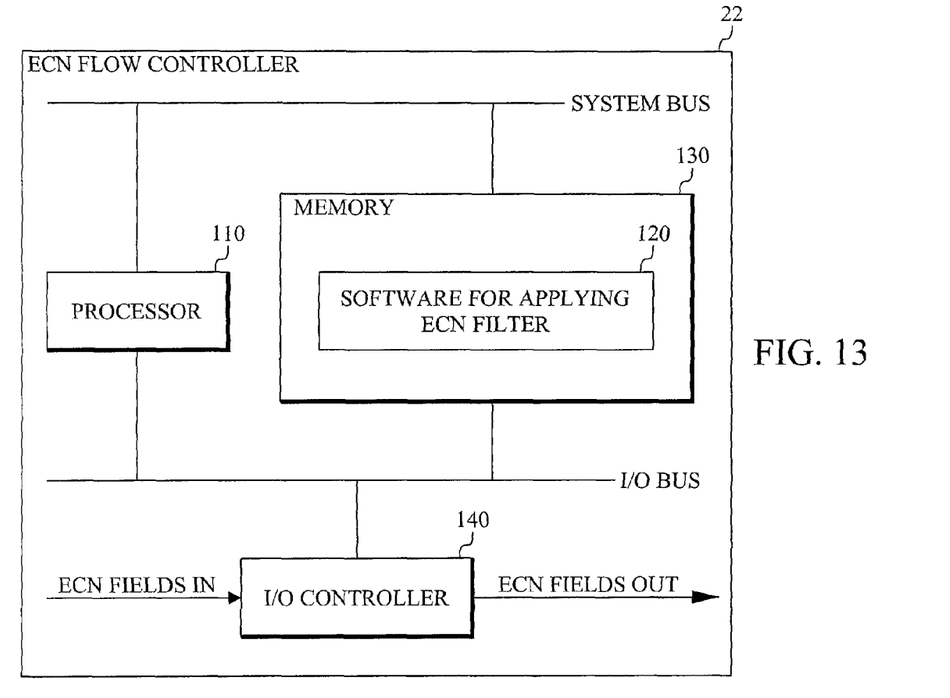
FIG. 13 is a block diagram of an embodiment of an ECN flow controller in accordance with the present technology.

FIG. 13 is a block diagram of an embodiment of an ECN flow controller in accordance with the present technology. This embodiment is based on a processor 110, for example a micro processor, which executes software 120 for applying an ECN filter. The software is stored in memory 130. The processor 110 communicates with the memory over a system bus. The incoming ECN fields are received by an input/output (I/O) controller 140 controlling an I/O bus, to which the processor 110 and the memory 130 are connected. In this embodiment the ECN fields received by the I/O controller 140 are stored in the memory 130, where they are processed by the software 120. The software 120 may implement the functionality of the blocks in the embodiments of the ECN flow controller 22 described above. The filtered ECN fields obtained from the software 120 are outputted from the memory 130 by the I/O controller 140 over the I/O bus.

The ECN filter may be configured to generate sequences of consecutive packets with ECN-CE marked headers separated by sequences of consecutive packets with ECT marked headers. The ECN filter may also be configured to gradually increase the number of consecutive packets with ECN-CE marked headers as ECN rates increase.

Figure 14A:
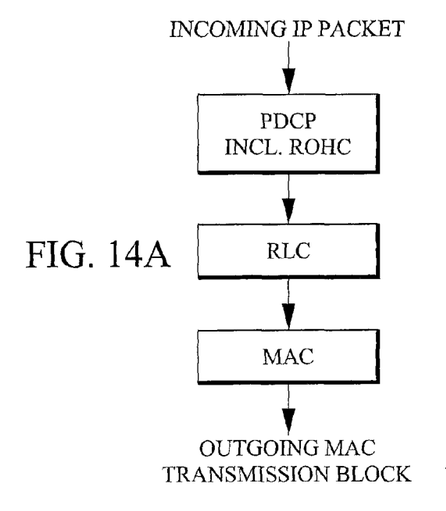
FIG. 14A-B illustrate protocol stacks without and with an ECN filter in accordance with the present technology.
Figure 14B:
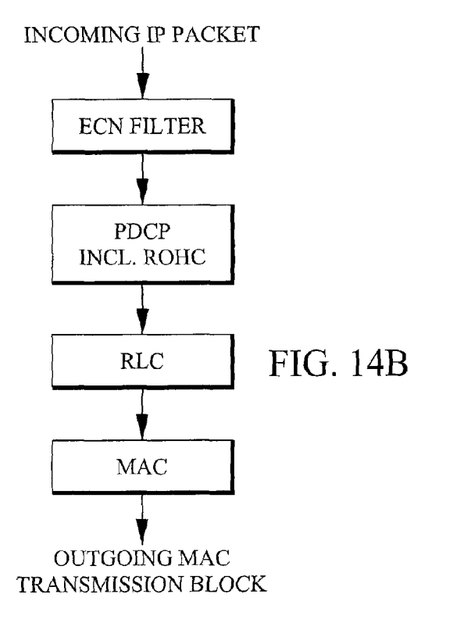

FIG. 14A-B illustrates protocol stacks without and with an ECN filter in accordance with the present technology. The conventional protocol stack in FIG. 14A includes the PDCP layer (which includes ROHC), the RLC layer and the MAC layer. FIG. 14B illustrates how an ECN filter is implemented in the protocol stack on the sending side, before the IP packet is sent to the PDCP layer where ROHC is applied. Since the PDCP, RLC and MAC layers are left unchanged, this means that no changes are required in the UE. This means that the present technology can be introduced whenever and wherever it is convenient to do so without redefining any standard.

As an alternative the ECN filter may also be integrated in the PDCP layer, before ROHC is applied.

The described ECN filtering technology may also be used in other access technologies, for example HSPA (High Speed Packet Access), EDGE (Enhanced Data Rates for GSM Evolution) and GPRS (General Packet Radio Service).

The described ECN filtering technology may also be implemented in an RNC or even a UE (for example in an ad-hoc network, where an UE can forward traffic to other UEs and mark packets with ECN-CE).

The capability to maintain the ECN rate differs slightly from embodiment to embodiment. For example:

The embodiment described with reference to FIG. 6 maintains the ECN rate almost exactly.

In the embodiment that uses a set of thresholds, the ECN rate is maintained approximately. In the example using thresholds with a separation of 10%, the ECN rate is maintained with an accuracy of 10%. The accuracy depends on the threshold separation: a larger separation (fewer thresholds) gives a lower accuracy and a smaller separation (more thresholds) gives a higher accuracy.

The embodiment described with reference to FIG. 8 maintains the ECN rate almost exactly during a session. However, due to possible delays there may be small ECN rate discrepancies at the end of a session.

It will be understood by those skilled in the art that various modifications and changes may be made to the present technology without departure from the scope thereof, which is defined by the appended claims.

ABBREVIATIONS

ECN Explicit Congestion Notification
ECN-CE ECN Congestion Experienced
DSP Digital Signal Processor
ECT ECN Capable Transport
EDGE Enhanced Data Rates for GSM Evolution
FPGA Field Programmable Gate Array
GPRS General Packet Radio Service
HSPA High Speed Packet Access
IP Internet Protocol
IPv4 IP version 4
IPv6 IP version 6

LTE Long Term Evolution
PDCP Packet Data Convergence Protocol
RLC Radio Link Control
ROHC RObust Header Compression
RTP Real-time Transport Protocol
TCP Transmission Control Protocol
UDP User Datagram Protocol
UE User Equipment

REFERENCES

[1a] IETF, RFC3095, "RObust Header Compression (ROHC): Framework and four profiles: RTP, UDP, ESP, and uncompressed", section 1, page 6-8.
[1b] IETF, RFC3095, "RObust Header Compression (ROHC): Framework and four profiles: RTP, UDP, ESP, and uncompressed", Appendix A.2.2, page 163.
[1c] IETF, RFC3095, "RObust Header Compression (ROHC): Framework and four profiles: RTP, UDP, ESP, and uncompressed", section 5.7.1, page 78-79.
[1d] IETF, RFC3095, "RObust Header Compression (ROHC): Framework and four profiles: RTP, UDP, ESP, and uncompressed", section 5.7.4, page 82-83.
[1e] IETF, RFC3095, "RObust Header Compression (ROHC): Framework and four profiles: RTP, UDP, ESP, and uncompressed", section 5.7.5, page 83-88.
[2] IETF, RFC3168, "The Addition of Explicit Congestion Notification (ECN) to IP", page 6-9

The invention claimed is:

1. A method of reducing packet header compression overhead due to a high Explicit Congestion Notification (ECN) rate, comprising:
applying an ECN filter for redistributing, with at least approximately the ECN rate, ECN Congestion Experienced (ECN-CE) marks among headers to reduce switching between ECN-CE marked and ECN Capable Transport (ECT) marked headers; and
generating sequences of consecutive packets with ECN-CE marked headers separated by sequences of consecutive packets with ECT marked headers.

2. The method of claim 1, further comprising the step of: determining the ECN rate from received headers.

3. The method of claim 2, further comprising the steps of: testing whether the determined ECN rate exceeds a predetermined threshold; and applying the ECN filter when it exceeds the predetermined threshold.

4. The method of claim 1, further comprising the step of: gradually increasing the number of consecutive ECN-CE marked packets as ECN rates increase.

5. The method of claim 1, wherein the header compression is Robust Header Compression (ROHC).

6. The method of claim 1, wherein the headers are IP packet headers.

7. An Explicit Congestion Notification (ECN) flow controller for reducing packet header compression over-head due to a high ECN rate, comprising:
an ECN filter configured to redistribute, with at least approximately the ECN rate, ECN Congestion Experienced (ECN-CE) marks among headers to reduce switching between ECN-CE marked and ECN Capable Transport (ECT) marked headers, wherein the ECN filter is further configured to generate sequences of consecutive packets with ECN-CE marked headers separated by sequences of consecutive packets with ECT marked headers.

8. The controller of claim 7, further comprising:
an ECN rate detector configured to determine the ECN rate from received headers.

9. The controller of claim 8, further comprising:
an ECN rate discriminator configured to test whether the deter-mined ECN rate exceeds a predetermined threshold, and to activate redistribution of ECN-CE marks by the ECN filter when it exceeds the predetermined threshold.

10. The controller of claim 7, wherein the ECN filter is further configured to gradually increase the number of consecutive packets with ECN-CE marked headers as ECN rates increase.

11. A network node including an ECN flow controller in accordance with claim 7.

12. The network node in accordance with claim 11, wherein the network node is an eNodeB.

13. The network node in accordance with claim 11, wherein the network node is an RNC.

14. The network node in accordance with claim 11, wherein the network node is a UE.

* * * * *